US006447207B1

(12) United States Patent
Ivey

(10) Patent No.: US 6,447,207 B1
(45) Date of Patent: Sep. 10, 2002

(54) AIR, SOIL AND GROUND WATER REMEDIATION COMPOSITIONS AND METHODS

(76) Inventor: George A. Ivey, 30-2055 Galerno Road, Campbell River, British Columbia (CA), V9W 6R8

( * ) Notice: Subject to any disclaimer, the term of this patent is extended or adjusted under 35 U.S.C. 154(b) by 0 days.

(21) Appl. No.: 09/967,944

(22) Filed: Oct. 2, 2001

Related U.S. Application Data

(62) Division of application No. 09/444,674, filed on Nov. 22, 1999, now Pat. No. 6,319,822.

(51) Int. Cl.$^7$ ................................................ B09C 1/02
(52) U.S. Cl. ........................... 405/128.25; 405/128.45; 510/110
(58) Field of Search ..................... 405/128.1, 128.25, 405/128.5; 510/110

(56) References Cited

U.S. PATENT DOCUMENTS

| | | | |
|---|---|---|---|
| 3,558,302 A | 1/1971 | Salvesen ......................... 71/97 |
| 4,673,697 A | 6/1987 | Rowley ......................... 523/218 |
| 4,869,825 A | 9/1989 | Steiner ......................... 210/634 |
| 4,997,313 A | 3/1991 | Gibson et al. ................. 405/128 |
| 5,011,329 A | 4/1991 | Nelson et al. ................. 405/128 |
| 5,035,537 A | 7/1991 | Rose ............................. 405/128 |
| 5,154,831 A | 10/1992 | Darian et al. ................. 210/639 |
| 5,156,686 A | 10/1992 | Van Slyke ..................... 134/26 |
| 5,160,217 A | 11/1992 | Metzer et al. ................. 405/128 |
| 5,161,914 A | 11/1992 | Rahn et al. ................... 405/128 |
| 5,249,888 A | 10/1993 | Braithwaite et al. ........ 405/128 |
| 5,252,138 A | 10/1993 | Guymon ......................... 134/42 |
| 5,263,795 A | 11/1993 | Corey et al. ................. 405/128 |
| 5,282,898 A | 2/1994 | Wu .............................. 106/447 |
| 5,286,386 A | 2/1994 | Darian et al. ................. 210/639 |
| 5,306,351 A | 4/1994 | Anderson et al. ............. 134/40 |
| 5,318,677 A | 6/1994 | Hirbour et al. .......... 204/141.5 |
| 5,342,147 A | 8/1994 | Payne et al. ................. 405/128 |
| 5,376,183 A | 12/1994 | Gatt et al. ..................... 134/40 |
| 5,427,688 A | 6/1995 | Sivavec ......................... 210/639 |
| 5,449,251 A | 9/1995 | Daily et al. ................. 405/128 |
| 5,458,437 A | 10/1995 | Jaffe et al. ................. 405/128 |
| 5,509,760 A | 4/1996 | Schriefer et al. ........... 405/258 |
| 5,525,008 A | 6/1996 | Wilson ......................... 405/128 |
| 5,553,974 A | 9/1996 | Nazarian ..................... 405/128 |
| 5,634,983 A | 6/1997 | Kammeraad ................. 134/25.1 |
| 5,660,613 A | 8/1997 | Bernier et al. ................. 71/15 |
| 5,686,282 A | 11/1997 | Lam et al. ................. 435/172.3 |
| 5,711,020 A | 1/1998 | Wolfe et al. ................. 588/203 |
| 5,817,187 A | 10/1998 | D'Muhala et al. ............. 134/40 |
| 5,922,665 A | 7/1999 | Liu .............................. 510/365 |
| 5,928,433 A | 7/1999 | Jahnke et al. ................... 134/2 |

FOREIGN PATENT DOCUMENTS

| | | |
|---|---|---|
| CA | 2042599 | 4/1991 |
| CA | 2089639 | 2/1993 |
| CA | 1322862 | 10/1993 |

Primary Examiner—John Hardee
(74) Attorney, Agent, or Firm—Mario Theriault

(57) ABSTRACT

A remediation composition for cleaning a soil mass and ground water contaminated with an organic contaminant and for reducing emanation of foul air from contaminated sites. The composition comprises an aqueous carrier, TRITON X-100 as a first surfactant, and a second surfactant which is selected from a group of surfactants consisting of TRITON X-155 and TRITON X-190. In presence of certain hydrocarbon, a total contaminant-emulsifying capacity of the remediation composition is greater than a sum of the contaminant-emulsifying capacities of the first and second surfactants. In another aspect of the present invention, surfactants TRITON X-15, TRITON X-35 and TRITON X-45 are used in association with TRITON X-100 such that their miscibilities with an aqueous carrier in the presence of TRITON X-100 is greater than their solubilities with the aqueous carrier alone. In yet another aspect of the invention, the remediation solutions are applied in situ to a contaminated site and the ground water table in the contaminated soil is repeatedly raised above and lowered below the contaminated region during the entire remediation process.

8 Claims, 4 Drawing Sheets

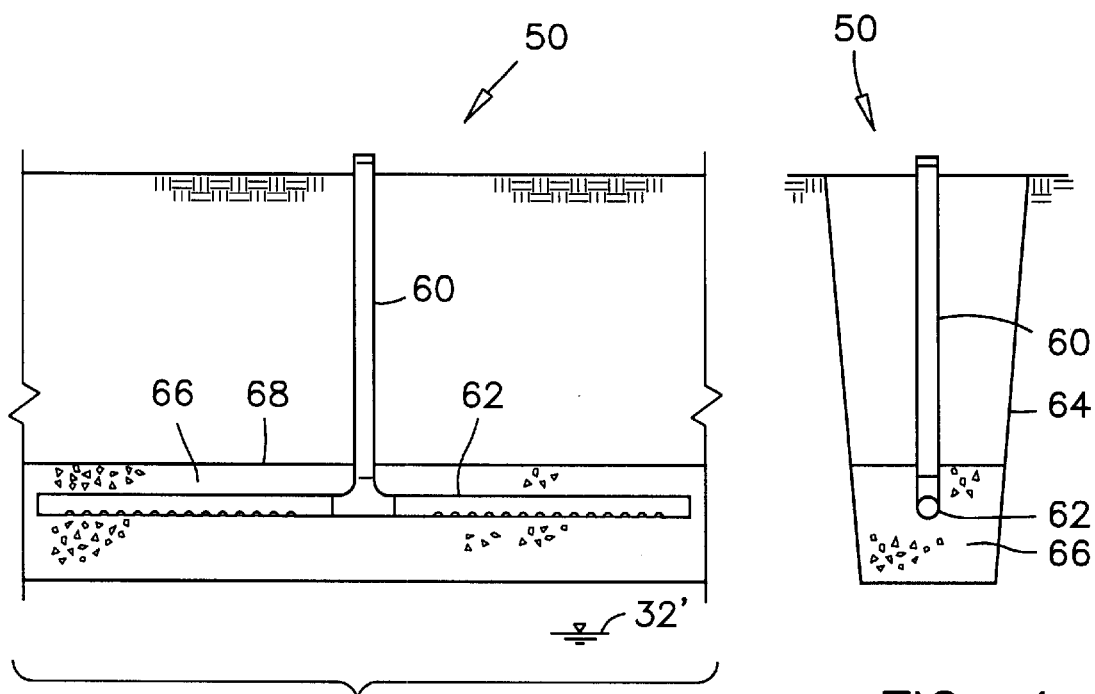
FIG. 3
FIG. 4
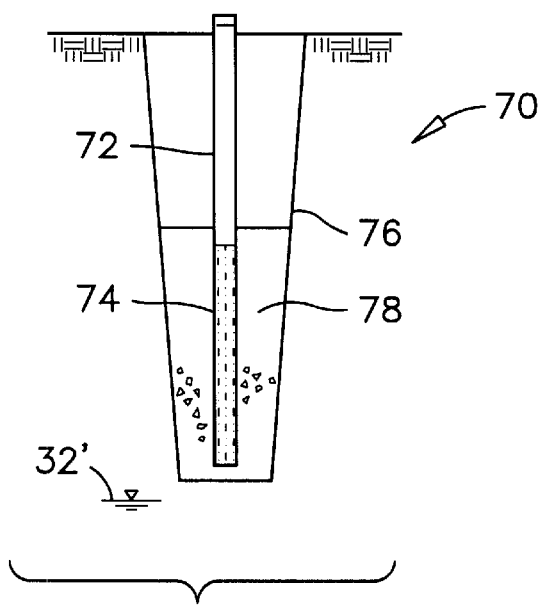
FIG. 5

AIR, SOIL AND GROUND WATER REMEDIATION COMPOSITIONS AND METHODS

This is a Division of U.S. patent application Ser. No. 09/444,674, filed on Nov. 22, 1999, now U.S. Pat. No. 6,319,822.

FIELD OF THE INVENTION

This invention pertains to remediation compositions and methods for cleaning contaminated soils, contaminated ground water and foul air emanating from contaminated sites. More particularly, this invention pertains to remedial compositions comprising TRITON™ surfactants, and processes using these compositions for cleaning sites contaminated with petroleum-based and organic compounds.

BACKGROUND OF THE INVENTION

Soil and ground water contaminations are frequent and often found around automotive garages, under heating oil storage tanks, near manufacturing plants, paint shops and in parking areas of industrial machinery for examples. The contaminants found at these locations are various and include in most cases hydrocarbons such as paint thinner, gasoline, fuel, kerosene, lubricants, bunker C oil and even pitch. In other words, the range of contaminants commonly found in contaminated soils and ground water contains numerous petroleum products including polycyclic aromatic hydrocarbons (PAH's). These are the contaminants that are of interest herein, and are often referred to hereinafter as Light Non-Aqueous Phase Liquids (LNAPL contaminants).

In the past, various methods have been used for cleaning soils contaminated with petroleum-based and organic contaminants. One of the best known method is referred to in the art as an "ex-situ" process which includes excavation and transport of the contaminated soil, and treatment of this soil at a remote location. A second best known method is an "in situ" process, which comprises the steps of leaching a remediation solution through a contaminated soil and pumping out the solution containing the emulsified contaminants, from one or more wells reaching below the contaminated region. Examples of in situ and ex-situ remediation processes are described in the following patents:

U.S. Pat. No. 4,869,825 issued on Sep. 26, 1989 to W. Steiner;
U.S. Pat. No. 4,997,313 issued on Mar. 5, 1991 to T. L. Gibson et al.;
U.S. Pat. No. 5,011,329 issued on Apr. 30, 1991 to J. M. Nelson et al.;
U.S. Pat. No. 5,035,537 issued on Jul. 30, 1991 to J. L. Rose;
U.S. Pat. No. 5,160,217 issued on Nov. 3, 1992 to N. Metzer et al.;
U.S. Pat. No. 5,161,914 issued on Nov. 10, 1992 to P. L. Rahn et al.;
U.S. Pat. No. 5,249,888 issued on Oct. 5, 1993 to K. E. Braithwaite et al.;
U.S. Pat. No. 5,263,795 issued on Nov. 23, 1993 to J. C. Corey et al.;
U.S. Pat. No. 5,342,147 issued on Aug. 30, 1994 to F. C. Payne et al.;
U.S. Pat. No. 5,449,251 issued on Sep. 12, 1995 to W. D. Daily et al.;
U.S. Pat. No. 5,509,760 issued on Apr. 23, 1996 to F. E. Schriefer et al.;
U.S. Pat. No. 5,553,974 issued on Sep. 10, 1996 to D. Nazarian;

It is believed that the most commonly used in situ remediation process is as disclosed in the U.S. Pat. No. 4,997,313 mentioned above. In this process, an aqueous surfactant solution is applied to the soil and is allowed to penetrate the soil and leach through the contaminated region. The leachate is removed from a recovery well at the middle of the contaminated region. Pumping is done at a rate of about twice the flow of injection of the remediation solution to the soil so as to reduce the water level in the region of the well, to induce a flow of leachate from the above soil formation into the well. This in situ method is also referred to as a "pump-and-treat" process wherein the leachate and the contaminated ground water are pumped from the underground to the surface and treated to separate the contaminants. The treated ground water is then returned underground.

The prior art also contains several emulsifier and surfactant compositions for cleaning a contaminated soil, whether the method is carried out in situ or ex-situ. Examples of remediation compositions of the prior art are found in the following patents:

Canadian Patent Application 2,089,639, published on Feb. 14, 1993 by L. M. Purcell et al.;
U.S. Pat. No. 5,156,686 issued on Oct. 20, 1992 to D. C. Van Slyke;
U.S. Pat. No. 5,252,138 issued on Oct. 12, 1993 to E. P. Guymon;
U.S. Pat. No. 5,376,183 issued on Dec. 27, 1994 to S. Gatt et al.;
U.S. Pat. No. 5,525,008 issued on Jun. 11, 1996 to J. T. Wilson.

It is also known that some of the soil remediation compositions of the prior art contain one or more of the TRITON™ surfactants or their chemical equivalents. TRITON™ surfactants are manufactured by Union Carbide Corporation from Danbury, Conn. USA. The following patents are specific examples of remediation compositions containing one or more of the TRITON surfactants.

Canadian Patent 1,322,862 issued on Oct. 12, 1993 to T. Cseh et al.;
Canadian Application for Patent 2,042,599 published on Apr. 11, 1991 by B. E. Peacock;
U.S. Pat. No. 5,154,831 issued on Oct. 13, 1992 to S. T. Darian et al.;
U.S. Pat. No. 5,286,386 issued on Feb. 15, 1994 to S. T. Darian et al.;
U.S. Pat. No. 5,306,351 issued on Apr. 26, 1994 to W. J. Anderson;
U.S. Pat. No. 5,427,688 issued on Jun. 27, 1995 to T. M. Sivavec;
U.S. Pat. No. 5,634,983 issued on Jun. 3, 1997 to N. Kammeraad;
U.S. Pat. No. 5,660,613 issued on Aug. 26, 1997 to R. L. Bernier et al.;
U.S. Pat. No. 5,711,020 issued on Jan. 20, 1998 to N. L. Wolfe et al.;
U.S. Pat. No. 5,817,187 issued on Oct. 6, 1998 to T. F. D'Muhala et al.;
U.S. Pat. No. 5,922,665 issued on Jul. 13, 1999 to A. Liu;
U.S. Pat. No. 5,928,433 issued on Jul. 27, 1999 to R. W. Jahnke et al;

In the past, the in situ or pump-and-treat remediation method has been preferred to the ex-situ process, basically for cost consideration and for not disrupting the terrain. However, these in situ methods are generally tedious, can require years to perform, and may never fully return the soil and ground water to an acceptable condition to serve as a drinking water aquifer.

Therefore, it is believed that a continuing need exists in the art for remediation compositions and accompanying methodology, to clean contaminated soils and ground water more efficiently, reliably, economically and safely than has heretofore occurred with conventional methods.

SUMMARY OF THE INVENTION

The present invention provides for remediation compositions and solutions which have excellent contaminant-emulsifying capacities for cleaning contaminated sites quickly, thoroughly and economically. The remediation solutions of the present invention have a very low eco-toxicity and are biodegradable in a relatively short time. The present invention also provides for methods for cleaning contaminated soils, contaminated ground water and air emanating from a contaminated site.

Broadly, in accordance with one aspect of the present invention there is provided a remediation composition for cleaning a soil mass and/or ground water contaminated with an organic contaminant. The remediation composition comprises an aqueous carrier, a first surfactant having a first contaminant-emulsifying capacity mixed with the aqueous carrier, and a second surfactant having a second contaminant-emulsifying capacity, mixed with the aqueous carrier and with the first surfactant. The first surfactant is TRITON X-100 and the second surfactant is selected from a group of surfactants consisting of TRITON X-155 and TRITON X-190.

In use, in presence of certain hydrocarbon contaminants, a total contaminant-emulsifying capacity of the remediation composition is greater than a sum of the contaminant-emulsifying capacities of the first and second surfactants alone in the aqueous carrier. In some cases, the contaminant-emulsifying capacity of the remediation composition has been found to be about three times as much as the sum of the contaminant-emulsifying capacities of the first and second surfactants alone in the aqueous carrier.

In further aspects of the present invention, three basic remediation compositions have been formulated for cleaning soils and ground water contaminated with a wide range of LNAPL contaminants. The three broad formulas are as follows:

a) When the contaminant contains a light range hydrocarbon, including PAH's, the remediation composition comprises per weight in an aqueous carrier:
  TRITON X-100: 1%;
  TRITON X-155: 1%;
  TRITON X-190: 0.5%;
  TRITON X-45: 0.2%, and
  TRITON X-35: 0.2%.

b) When the contaminant contains a middle range hydrocarbon, the remediation composition comprises per weight in an aqueous carrier:
  TRITON X-100: 1%;
  TRITON X-155: 1%;
  TRITON X-190: 0.2%;
  TRITON X-45: 0.5%, and
  TRITON X-35: 0.05%.

c) When the contaminant contains a heavy range hydrocarbon, the remediation composition comprises per weight in an aqueous carrier:
  TRITON X-100: 1%;
  TRITON X-155: 1%, and
  TRITON X-190: 1%.

In another aspect of the present invention, there is provided a remediation composition which comprises an aqueous carrier, a first surfactant having a first solubility with the aqueous carrier, mixed with the aqueous carrier, and a second surfactant having a second solubility with the aqueous carrier, mixed with the aqueous carrier and with the first surfactant. The first surfactant is TRITON X-100 and the second surfactant is selected from a group of surfactants consisting of TRITON X-15, TRITON X-35 and TRITON X-45. In this composition, the miscibility of the second surfactant in the composition is greater than its solubility with the aqueous carrier alone.

In another aspect of the present invention, the remediation compositions are mixed with purging water in a proportion of about 1,000 to 1,100 parts of purging water for one part of a total of the aqueous carrier and the surfactants. The remediation solutions thus obtained have a very low eco-toxicity, are highly biodegradable, and still have an exceptional emulsifying capacity for LNAPL contaminants. As will be understood, the term remediation solution is used herein to designate a remediation composition according to the present invention in a diluted form with purging water.

In yet another aspect of the present invention, there is provided a method for in situ cleaning a soil mass contaminated with an organic contaminant and ground water associated with this soil mass. The method comprises the steps of defining a location of the contaminant in the soil mass; defining a static level of the ground water relative to the soil mass and the contaminant; if the contaminant is at proximity of the ground water table, defining the thickness of a contaminated smear zone due to static level variations in the ground water table, and injecting a remediation solution in the soil mass until the level of the ground water rises above its static level, above the contaminant and above the contaminated smear zone, thereby allowing the remediation solution to soak into the contaminant for encapsulating therein portions of the contaminant. When the remediation solution has completely covered the contaminant, pumping of the remediation solution and of the ground water from the soil mass is effected until the level of the ground water is below the static level and the contaminant. The remediation solution and the ground water are then treated for extracting the contaminant therefrom. The raising and lowering of the water table are effected repeatedly until the contaminant has been washed out from the soil mass and ground water to an acceptable level. This method is particularly advantageous for quickly and simultaneously cleaning a soil mass and ground water associated with the soil mass.

In yet a further aspect of the present invention, there is provided a method for ex-situ cleaning a contaminated site. This particular method comprises the step of providing an apparatus having a soil-receiving compartment, an array of pipes and nozzles disposed above the soil-receiving compartment and a drain compartment disposed below the soil-receiving compartment. The method also includes the steps of excavating a soil mass from a designated portion of a contaminated site, transferring this soil mass into the soil-receiving compartment of the apparatus, and applying to the soil mass a remediation composition comprising TRITON X-100 and one surfactant selected from a group of surfactants consisting of TRITON X-155 and TRITON X-190. After cleaning of the soil mass, it is returned to the site as backfill for example.

This method is particularly efficient for cleaning a site ex-situ without transporting the contaminated soil over great distances. This method is also efficient for cleaning a contaminated site systematically one portion at the time while monitoring a level of contamination in each portion before and after the remediation process.

In still a further aspect of the present invention, there is provided a method for reducing an emanation of volatile contaminants from a site contaminated with an odorous organic contaminant. This method comprises the step of applying to the contaminated site a remediation composition comprising TRITON X-100 and one surfactant selected from a group of surfactants consisting of TRITON X-155 and TRITON X-190. The volatile contaminants are thereby solubilized and retained to the remediation composition to reduce emanations of foul air from the contaminated site before and during a remediation process for example.

Still another feature of the present invention is that the remediation compositions are susceptible of a low cost of manufacture with regards to both materials and labor, and which accordingly are then susceptible of low prices of sale to the industry, thereby making remediation efforts economically available to the public.

BRIEF DESCRIPTION OF THE DRAWINGS

Preferred embodiments of an installation and an apparatus for carrying out one method according to this invention are illustrated in the accompanying drawings in which like numerals denote like parts throughout the several views, and in which:

FIG. 3 is an enlarged elevation side view of an injection gallery used in a preferred installation for cleaning a contaminated site in situ;

FIG. 4 is an end view of the injection gallery shown in FIG. 3;

FIG. 5 is an elevation view of an injection well or of a recovery well used in a preferred installation for cleaning a contaminated site in situ;

DETAILED DESCRIPTION OF THE PREFERRED EMBODIMENTS

Figure 1:
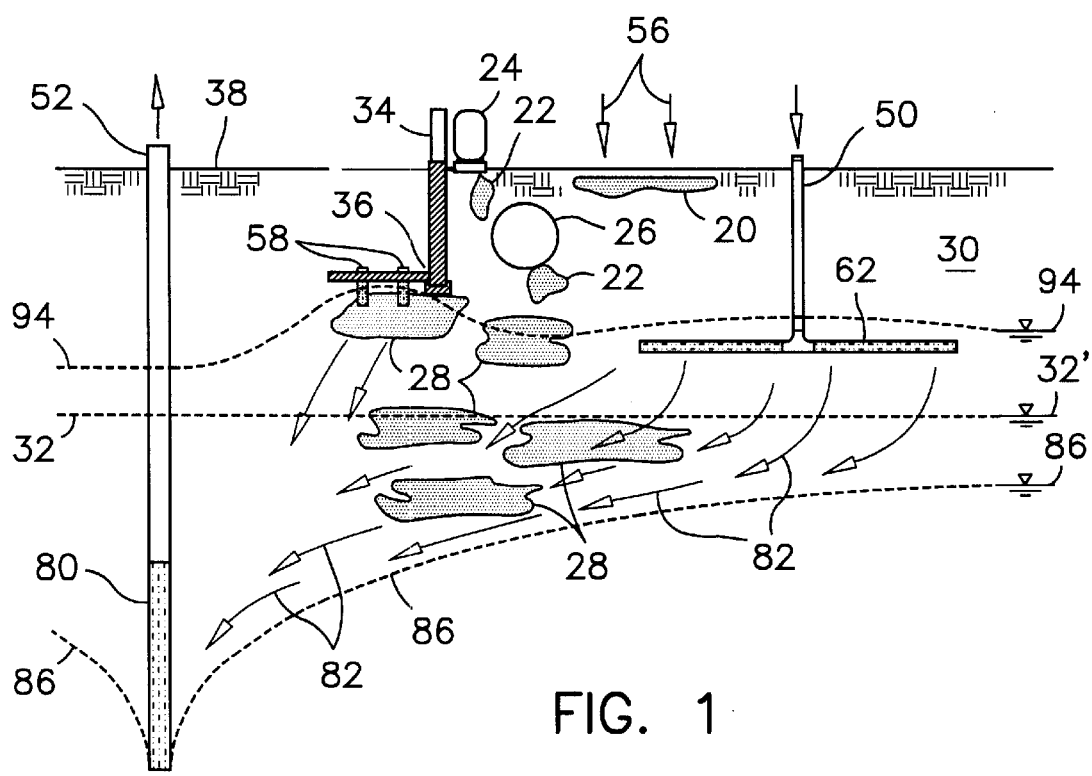
FIG. 1 is a cross-section elevation view of a contaminated site and a preferred installation for cleaning a contaminated site in situ.
Figure 2:
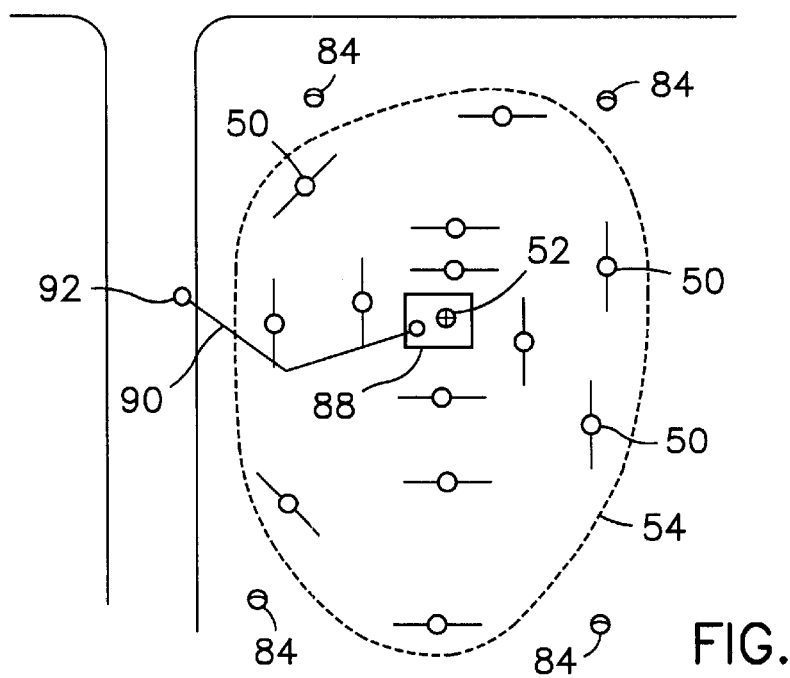
FIG. 2 is a top plan view of a contaminated site and of a preferred installation for cleaning a contaminated site in situ.

While this invention is susceptible of embodiments in many different forms, there will be described in details herein specific compositions, solutions, methods and an apparatus for cleaning contaminated soils and ground water, with the understanding that the present disclosure is to be considered as an example of the principles of the invention and is not intended to limit the invention to the compositions and method described and illustrated.

The Remediation Compositions

The remediation compositions according to the preferred embodiments comprise an aqueous carrier, usually water, and TRITON X-100™ as a base surfactant, with one or more components selected from a group of components consisting of TRITON X-15™, X-35, X-40, X-155 and X-190 in various proportions as co-surfactants. The above surfactants are combinable into specific compositions capable of cleaning a soil and ground water contaminated with any of the LNAPL contaminants.

For reference purposes, the above products are known as follows:

TRITON X-15™: Nonionic Surfactant: $C_{16}H_{26}O_2$
  Chemical name: Octylphenoxypolyethoxyethanol;

TRITON X-35™: Nonionic Surfactant: $C_{20}H_{34}O_4$
  Chemical name: Octylphenoxypolyethoxyethanol;

TRITON X-45™: Nonionic Surfactant: $C_{24}H_{42}O_6$;
  Chemical name: Octylphenoxypolyethoxyethanol;

TRITON X-100™ Nonionic Surfactant: $C_{33}H_{60}O_{10.5}$;
  Chemical name: Octylphenoxypolyethoxyethanol;

TRITON X-155™: Surfactant; (mixture of ingredients)
  i.e.: 58% w/w diamylphenoxypolyethoxyethanol, 20% w/w methylenebisamylphenoxypolyethoxyethanol;

TRITON X-190™: Emulsifier; (mixture of ingredients)
  i.e.: 39% w/w calcium dodecylbenzene sulfonate, 30% w/w octylphenoxypolyethoxyethanol.

The proportions of the co-surfactants as well as of the base surfactant are determined according to the type of contaminant to be removed. Therefore, a contaminated soil and/or ground water sample is firstly extracted and analysed. The contaminant is identified as well as its concentration, and a map of the contaminated area is drawn up. Then, a remediation composition is formulated and a plan is prepared to install one or more injection galleries and one or more recovery wells extending below the contaminated region. The actual remediation process will be explained later when making reference to the sections entitled Application of the Remediation Compositions in an In Situ or Ex-situ Processes.

Formulation of the Remediation Compositions

Petroleum products contain components that are generally low molecular weight such as aromatic hydrocarbons, (benzene, toluene, ethylbenzene, and xylenes) and aliphatic hydrocarbons (methane, propane, butane, and octane).

A) When a polycyclic aromatic hydrocarbon (PAH) is present in a contaminant, it was found that TRITON X-155 provides for the best cleaning results. The surfactants TRITON X-190 and X-100 are known to show a slight increase in the emulsification of the contaminant.

B) When an aliphatic hydrocarbon is present in the contaminant, it was found that the best remediation composition contains TRITON X-35 and X-45 in a ratio of 1:1:5 with TRITON X-100.

C) When an aromatic hydrocarbon is present in the contaminant, it was found that the best composition contains TRITON X-155 and X-190 in a ratio of 1:1:1 with TRITON X-100.

For examples, the Table 1 below shows typical remediation compositions that work best with the corresponding contaminants shown. The results show contaminant concentration in the mobile phase.

TABLE 1

Emulsion of petroleum products with different surfactants

| Petroleum Product: | Percent of different Surfactants used | | | | | Conc. (ppt) |
|---|---|---|---|---|---|---|
| | X-35 | X-45 | X-100 | X-155 | X-190 | |
| Gasoline | 0.1 | 0.1 | 0.5 | 0.5 | 0.25 | 760 |
| Brake Fluid | 0.25 | 0.25 | 0.5 | 0.5 | 0.1 | 12050 |
| Premium 15w40 | 0.25 | 0.25 | 0.5 | 0.5 | 0.1 | 3020 |
| Bunker C | — | — | 0.5 | 0.5 | 0.5 | 31150 |

The solubility of the surfactants in water increase from TRITON X-15, X-35, and X-45. TRITON X-100 is miscible in water and is used as the base surfactant in all remediation compositions. The solubility of the other surfactants increases in the presence of TRITON X-100. In that respect, the preferred ratios of the surfactants TRITON X-15, TRITON X-35, and TRITON X-45 combined with TRITON X-100 are 1:10, 1:5, and 1:2 respectively. The surfactants TRITON X-155 and X-190 were found to be more soluble in neat water than the aforementioned surfactants and therefore both surfactants are used in a 1:1 ratio with TRITON X-100.

It was found that TRITON X-100 and X-190 increase the solubility of aromatic hydrocarbons. Since gasoline has a high percentage of aromatic hydrocarbons, the preferred composition in this case is formulated with high concentrations of these surfactants. Small concentrations of TRITON X-35 and X-45 may be added to emulsify the low percentage of aliphatic hydrocarbons present.

In order to increase the solubility of brake fluid and engine oil, the formulation must be adjusted for the increase in aliphatic hydrocarbons and the decrease in aromatic hydrocarbons. Therefore the concentration of at least one of TRITON X-35 and X-45 is preferably increased. The concentration of X-190 is preferably decreased. The concentrations of TRITON X-100 and X-155 should remain the same because they are needed to solubilize TRITON X-35 and X-45.

It was also found that the contaminant-emulsifying capacity of TRITON X-155 or X-190 was significantly increased when combined to TRITON X-100. See Tables 2–8 below. In fact, the contaminant-emulsifying capacity of a composition comprising either surfactant and TRITON X-100 was found to be greater than the sum of the contaminant-emulsifying capacities of each surfactant alone in water.

TABLE 2

Emulsion of Toluene

| Surfactant | Concentration | Contaminant in Mobile Phase |
|---|---|---|
| X-100 | 0.5% | 10,200 ppm |
| X-190 | 0.5% | 11,700 ppm |
| X-100 + X-190 | 0.5% + 0.5% | 29,000 ppm |

TABLE 3

Emulsion of Toluene

| Surfactant | Concentration | Contaminant in Mobile Phase |
|---|---|---|
| X-100 | 0.5% | 10,200 ppm |
| X-155 | 0.5% | 6,000 ppm |

TABLE 3-continued

Emulsion of Toluene

| Surfactant | Concentration | Contaminant in Mobile Phase |
|---|---|---|
| X-100 + X-155 | 0.5% + 0.5% | 46,300 ppm |

TABLE 4

Emulsion of m-xylene

| Surfactant | Concentration | Contaminant in Mobile Phase |
|---|---|---|
| X-100 | 0.5% | 10,900 ppm |
| X-190 | 0.5% | 21,400 ppm |
| X-100 + X-190 | 0.5% + 0.5% | 40,700 ppm |

TABLE 5

Emulsion of m-xylene

| Surfactant | Concentration | Contaminant in Mobile Phase |
|---|---|---|
| X-100 | 0.5% | 10,900 ppm |
| X-155 | 0.5% | 7,200 ppm |
| X-100 + X-155 | 0.5% + 0.5% | 50,500 ppm |

TABLE 6

Emulsion of 1,2,4 trimethylbenzene

| Surfactant | Concentration | Contaminant in Mobile Phase |
|---|---|---|
| X-100 | 0.5% | 5,900 ppm |
| X-155 | 0.5% | 3,600 ppm |
| X-100 + X-155 | 0.5% + 0.5% | 32,500 ppm |

TABLE 7

Emulsion of iso-octane

| Surfactant | Concentration | Contaminant in Mobile Phase |
|---|---|---|
| X-100 | 0.5% | 1,700 ppm |
| X-155 | 0.5% | 700 ppm |
| X-100 + X-155 | 0.5% + 0.5% | 3,800 ppm |

TABLE 8

Emulsion of phenanthrene

| Surfactant | Concentration | Contaminant in Mobile Phase |
|---|---|---|
| X-100 | 0.5% | 6.4 ppm |
| X-155 | 0.5% | 5.1 ppm |
| X-100 + X-155 | 0.5% + 0.5% | 15 ppm |

Preparation of the Remediation Compositions

Preferably, there are three main remediation compositions, with minor variations to each one, depending upon the contaminant being removed. These main remediation compositions are prepared for Light Range Hydrocarbons, Medium Range Hydrocarbons and Heavy Range Hydrocarbons.

For Light Range Hydrocarbons

The mixing procedure for preparing a remediation composition for treating soils and ground water contaminated with Light Range Hydrocarbons including PAH's is carried out as follows. This composition is used for treating sites contaminated with gasoline, diesel fuel, etc.

The first step is to get the TRITON X-100 into solution with an aqueous carrier. Approximately 10 ml. are added to one liter of water to give a concentration of TRITON X-100 in water of 1%. The solution is stirred for 10 min., in which time the solution should become clear. When the solution is clear, then 10 ml. of TRITON X-155 are added to the solution. This gives a TRITON X-155 concentration of 1% in the solution. The solution is stirred for about 10 min., until the solution becomes clear again. Once the solution is clear, a 5 ml. portion of TRITON X-190 is added. This gives a TRITON X-190 concentration of 0.5%. The solution is stirred for 10 min. by which period it should become clear. At this point, 2 ml. of TRITON X-45 are added to the solution. This gives a TRITON X-45 concentration of 0.2%. TRITON X-45 is not very soluble in water. Therefore the solution should be stirred for about 15 min. After stirring, the solution may not be as clear as before. However, this is expected. TRITON X-35 can be added in a 2 ml. portion and the solution is stirred for another 15 min. This gives a total surfactant concentration of 2.9%.

For Middle Range Hydrocarbons

The mixing procedure for preparing a remediation composition for treating soils and ground water contaminated with Middle Range Hydrocarbons is effected as follows. This composition is used for treating sites contaminated with engine oils, lubricants, etc.

The first step is to get the TRITON X-100 into solution with an aqueous carrier. Approximately 10 ml. of TRITON X-100 are added to one liter of water to give a concentration of 1%. The solution is stirred for 10 min., in which time the solution should become be clear. Once the solution is clear, then 10 ml. of TRITON X-155 are added to the solution. This gives a TRITON X-155 concentration of 1% in the solution. The solution is stirred again for another 10 min. and the solution should turn clear again. Once the solution is clear, then 2 ml. of TRITON X-190 are added to it. This gives a TRITON X-190 concentration of 0.2%. The solution is stirred for about 10 min. until the solution becomes clear. At this point 5 ml. of TRITON X-45 are added to the solution. This gives a TRITON X-45 concentration of 0.5%. TRITON X-45 is not very soluble in water. Therefore, the solution should be stirred for 15 min. After this period, the solution may not be as clear as before, but this is expected. TRITON X-35 is added in a 0.5 ml portion and stirred for 15 min. This gives a total surfactant concentration of 2.75%.

For Heavy Range Hydrocarbons

The mixing procedure for preparing a remediation composition for treating soils and ground water contaminated with Heavy Range Hydrocarbons is effected as follows. This composition is used for treating sites contaminated with Bunker C oil, etc.

Approximately 10 ml. of TRITON X-100 are added to one liter of water to give a surfactant concentration of 1%. The solution is stirred for 10 min., in which time the solution should become be clear. Once the solution is clear, 10 ml. of TRITON X-155 are added to the solution. This will give a TRITON X-155 concentration of 1% in the solution. The solution is stirred for another 10 min. and it should turn clear again. Once the solution is clear, 10 ml. of TRITON X-190 are added. This gives a TRITON X-190 concentration of 1%. The solution is stirred for about 10 min., until the solution becomes clear. This gives a total surfactant concentration of 3.0%.

It should be noted that temperature at which these procedures are carried out makes a difference in the solubility of the surfactants. It is therefore essential that the mixing procedures be carried out at a temperature of 25° C. or higher. Using warm to hot water with a temperature range of 30–70° C. is also recommended. The required mixing period for each component may decrease slightly with an increase in water temperature.

Storage of the prepared compositions should be done at room temperature of about 22° C. Each remediation composition should be used within 72 to 96 hours of its preparation to avoid the onset of biodegradation and spoiling. It should be noted that if the temperature of a stored composition drops below 15° C. and the composition appears excessively cloudy, the composition has spoiled and should not be used.

It will be appreciated from the above description, that each of the three main remediation compositions may also be tailored to clean specific types of LNAPL contaminants. As to the manner for mixing these variants, the same should be apparent from the above description and accordingly no further instruction is provided. Similarly, the remediation compositions described hereinabove are prepared in batches containing only one liter of water. The above proportions may be extrapolated to prepare larger batches. In that respect, it has been found that batches prepared in nominal 22 liter containers are quite appropriate for handling and transportation to a work site and for introduction into an injection gallery.

The above remediation compositions are in a concentrated form and are intended to be injected through a contaminated soil matrix with purging water. In an in situ process, the recommended volume of purging water relative to the volume of remediation composition is between about 1,000:1 to about 1,100:1. In the cases of ex-situ processes, the recommended purging water volume to be used in relation to the remediation composition is between about 125:1 to about 136:1. Remediation solutions prepared according to the above proportions have demonstrated very good efficiency, very low eco-toxicity and rapid bio-degradation.

Application of the Remediation Compositions in an In Situ Process

The method for cleaning a contaminated soil and groundwater according to a preferred embodiment of the present invention involves the installation of one or more injection galleries in the vicinity of the spill area. A recovery well is installed in the vicinity of the spill area, but opposite the injection galleries relative to the spill area such that a flow can be created between the injection galleries, through the contaminated area and toward the recovery well. A pump is installed on the recovery well for pumping the effluent from the well to a treatment installation.

Injection of a remediation composition is then carried out. The remediation composition which is introduced at the injection galleries with purging water, flows through the soil mass thereby re-dissolving the trapped contaminant and allowing for its capture at the recovery well for subsequent treatment by conventional means. The frequency of injections is determined by monitoring the concentration of contaminant recovered at the treatment installation.

In another aspect of the remediation compositions according to the preferred embodiments, it was found that the use thereof reduces the amount of fumes emanating from a contaminated site, as compared to other methods. Petroleum products contain several volatile components that represent major health concerns. It was found that the remediation compositions according to the preferred embodiment solubilizes these compounds upon contact, thus decreasing the amount of each volatile component that can be released into a vapour phase. The resulting impact on the air quality in the vicinity of a site under remediation is thereby greatly reduced.

Field application of the remediation compositions according to the preferred embodiments is referred to as a phase transfer process and is described in details hereinbelow. Illustrations are provided to aid interpretation and understanding of this process. As will be understood, this technology is used for treating contamination of the ground water table, soil mass and bedrock matrix, and indoor and outdoor air quality emanating from a contaminated site.

Referring now to FIG. 1, there are illustrated therein, examples of various types of soil and ground water contaminations, and a typical installation for cleaning these soil masses and ground water. As illustrated, LNAPL contaminants can enter into the environment via accidental surface spills 20, leaks 22 at above ground or underground fuel storage tanks 24, 26 and at their associated fuel lines. The LNAPL contaminants 28 may migrate a substantial distance on the ground surface prior to entering and contaminating the underlying soil matrix and/or bedrock 30. Further migration and eventual contamination of the shallow water table 32 and deep ground water aquifers may also occur.

If building structures 34 are present in the vicinity of the soil, bedrock, and/or ground water contamination 28, the volatile hydrocarbon fractions may be released and migrate through the soil mass and exit into the building through cracks in the building foundation 36, floor, drains, or through an earth floor, thereby negatively impacting on the indoor air quality of that building. Similarly, volatile contaminants may migrate to the open ground surface 38, resulting in a deterioration of the ambient air quality around the contaminated site.

Referring now to FIGS. 2–5, while still looking at the illustration of FIG. 1, the preferred installation for carrying out the phase transfer process according of the preferred embodiment comprises one or more injection galleries 50 or injection wells, and at least one recovery well 52. The process involves the introduction of a remediation composition into a contaminated site via the injection galleries 50 or injection wells. Following each injection of a remediation composition, purging water is introduced in the injection galleries 50 to carry the remediation composition through the contaminated area. Depending upon the characteristics of a site and the volume of remediation composition used, the volume of purging water is adjusted according to the aforementioned recommended proportions. In all cases, however, purging and pumping must be controlled to ensure adequate hydrologic containment and control of the contamination plume 54 (area of contamination).

When the contamination is immediately below the ground surface, such as indicated by label 20 in FIG. 1, the remediation solution is applied directly to the contaminated area as illustrated by arrows 56 in FIG. 1. Similarly, when the contamination is immediately below a basement floor, the remediation solution is preferably applied to the contaminated area through one of more injection wells 58 through the basement floor.

As may be understood from the illustrations in FIGS. 2–5, a site under remediation, can have as many as twelve or more injection galleries 50 or injection wells installed across the contamination plume 54, to properly effect treatment of the site and recovery of the LNAPL contaminants.

Each injection gallery 50 comprises a vertical pipe 60 connected to a horizontal perforated diffuser 62. Each injection gallery 50 is installed in a trench 64, which is backfilled and wherein the perforated diffuser 62 is embedded in a layer of crushed rocks 66 covered by a filtering membrane 68. The depth of the horizontal diffuser 62 is determined according to the characteristics of the contaminated region, but is preferably above the water table's static level 32'.

It will be appreciated that in determining the water table's static level 32' mentioned herein, consideration is given to fluctuations in the level of this water table due to seasonal precipitations or a shortage thereof. Consideration is also given to possible contaminated smear zone in the soil mass, generated by the fluctuation of the ground water table when the contaminant is at proximity of or extends below the static level.

Therefore the static level 32' mentioned herein is above a potential contaminated smear zone or above a maximum seasonal high level of the ground water table, when the contaminant is located near this high level.

An injection well 70 is similarly constructed, with a vertical pipe 72 having a perforated lower section 74 extending in a hole 76 partly filled with crushed rocks 78. The depth of the hole 72 is less than the water table's static level 32' at the site to be treated.

A recovery well 52 is constructed in a same manner as an injection well but extends below the water table's static level 32'. The depth of the recovery well 52 is selected so as to cause the remediation solution to penetrate the soil mass and to mix with the ground water, to entrain contamination in the soil mass as well as in the groundwater and to flow downward toward the perforated section 80 of the recovery well 52 as indicated by arrows 82.

During and following a series of injections of remediation composition at a given site, the level of contamination is continually monitored at one or more monitoring wells 84, which are constructed in a same manner as the recovery well 52 as just described. Monitoring is also effected at the recovery well 52. Pumping is effected at the recovery well 52 such that a draw-down cone 86 is maintained in the water table. The preferred draw-down cone 86 has a diameter of influence that is equal or exceeds a cross-section dimension or horizontal projection of the contamination plume 54.

When the remediation composition contacts a LNAPL contaminant, it strips it from the soil matrix and/or bedrock surface; encapsulates it into a hydrophilic micelle which can be easily carried in the flow of remediation solution and ground water, to a recovery well 52 for subsequent pumping and removal for treatment. Because of this encapsulation of the LNAPL contaminants inside hydrophilic micelles, these contaminants become less available in concentration to vaporize and migrate through the soil mass and/or bedrock matrix to contaminate ambient air.

Following treatment, the clean ground water and purging water from a treatment plant 88 can be transported by pipes 90 to a storm drain 92 along a street for example, for reintroduction into the environment.

Figure 6:
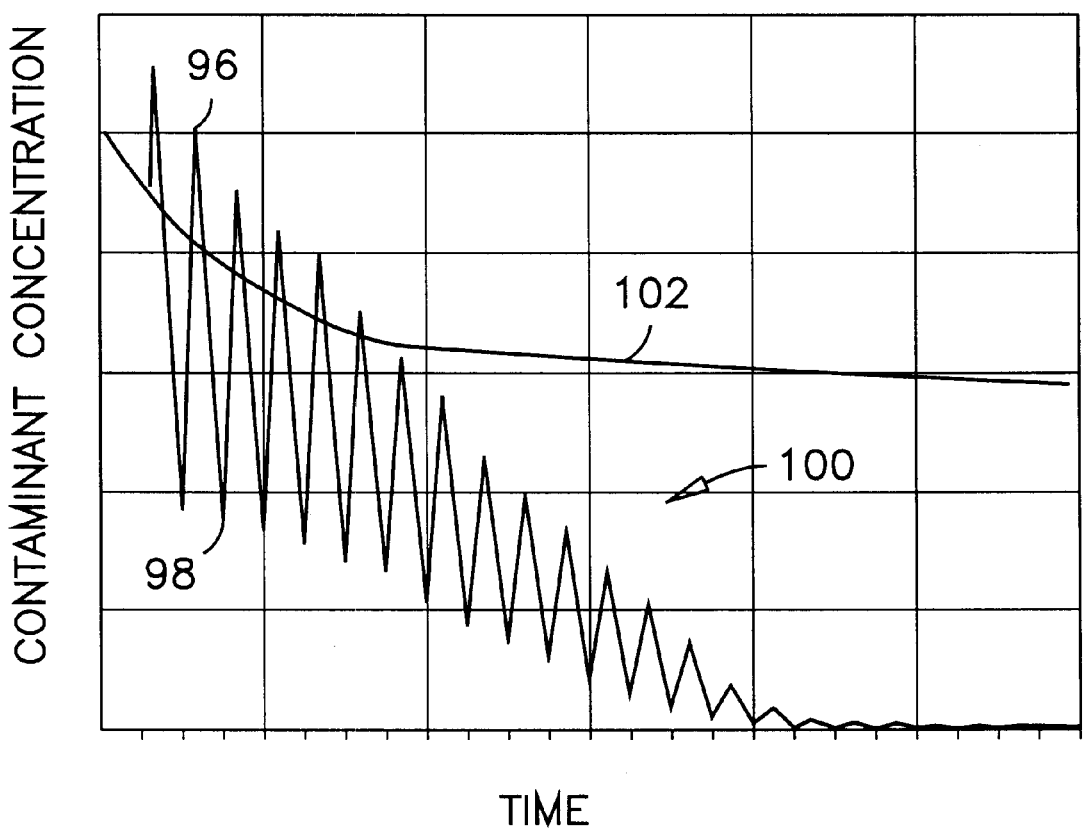
FIG. 6 is a typical response profile curve showing contaminant concentration variations during an in situ remediation process using the remediation compositions according to the present invention and a pulse-pumping action, as compared with a typical response profile curve of a conventional pump-and-treat process.

Considering now FIGS. 1 and 6, the phase transfer process according to the preferred embodiment further comprises a specific procedure for cleaning a contaminated site. This procedure, is referred to hereinbelow as a pulse pumping action. This procedure allows for the use and management of site conditions to aid better contact of the remediation composition with contaminants at a site being treated. In simple terms, the pulse pumping action involves the stopping of the pump and treatment system at a site for a period of time sufficiently long to allow the ground water table 32 to rise near its static level 32'. Once achieved and confirmed via field monitoring at the monitoring well 84 and recovery well 52 locations, the injection of a remediation solution is started. This causes the level 94 of the ground water table to rise above its static level 32', permitting the remediation solution and its components to soak into the soil across the entire contamination plume 54, and liberate the LNAPL contaminants. Then the pump is started and the recovery of the contaminants is effected at the recovery well 52. This pulse pumping action is methodically repeated during the entire phase transfer process.

The water quality monitoring at a recovery well 52 usually shows rise and fall indexes in the contaminant concentration, thereby confirming the liberation of the contaminants in correlation with the injections of remediation solutions. Referring to FIG. 6, the peaks 96 and valleys 98 in the response profile 100 of a pulse pumping action or phase transfer process show the rise and fall indexes in the contaminant concentration. These rise and fall indexes correspond to the injection of remediation solution and operation of the pump respectively. The rise 96 and fall 98 indexes in the contaminant concentration follow the movement of the water table, and in a cumulative aspect, the contaminant concentration curve 100 falls much faster than in a cleanup job effected by a conventional pump-and-treat method of the prior art, as illustrated by curve 102 in FIG. 6.

The application of the phase transfer process using one of the remediation compositions according to the preferred embodiments and a pulse pumping action have been found to be relatively efficient. Some cleaning projects carried out with the phase transfer process described herein have been found to be about at least 75% faster than most conventional remediation processes known.

The phase transfer process according to the preferred embodiment can be applied to new and mature sites contaminated with any type of LNAPL contaminants, without restriction of the degree of contamination. Also, the remediation compositions described herein can be used with most commercially available air, soil and/or ground water treatment systems.

Application of the Remediation Compositions in an Ex-situ Process

Figure 7:
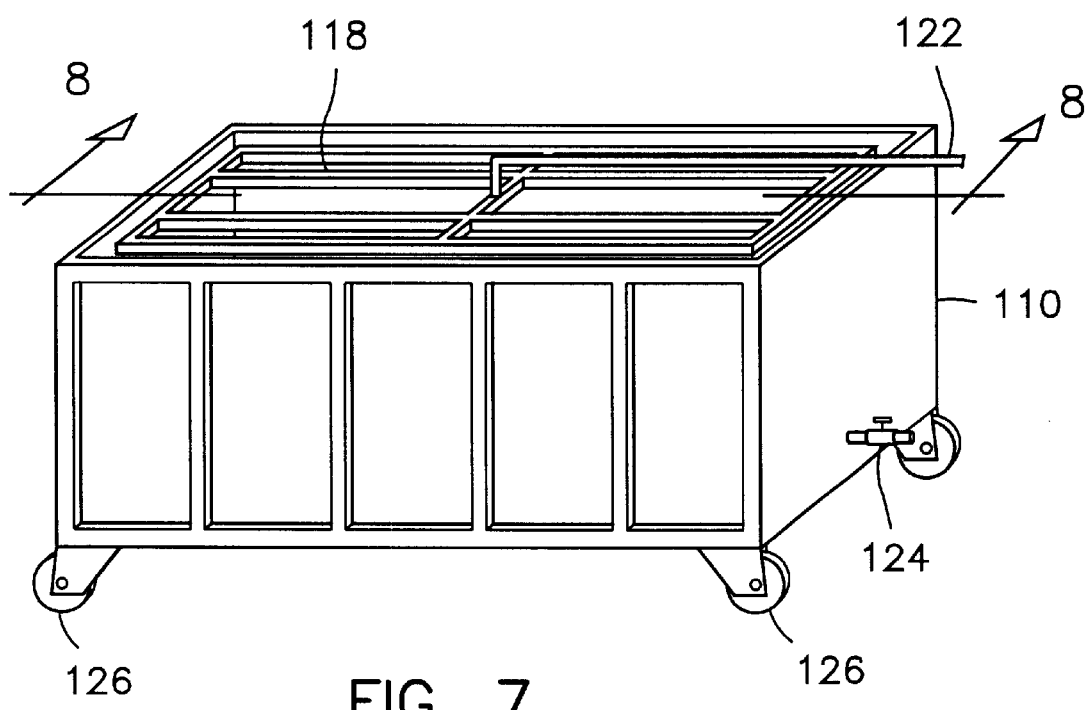
FIG. 7 is an isometric side and end view of a preferred apparatus usable for cleaning a contaminated soil ex-situ.
Figure 8:
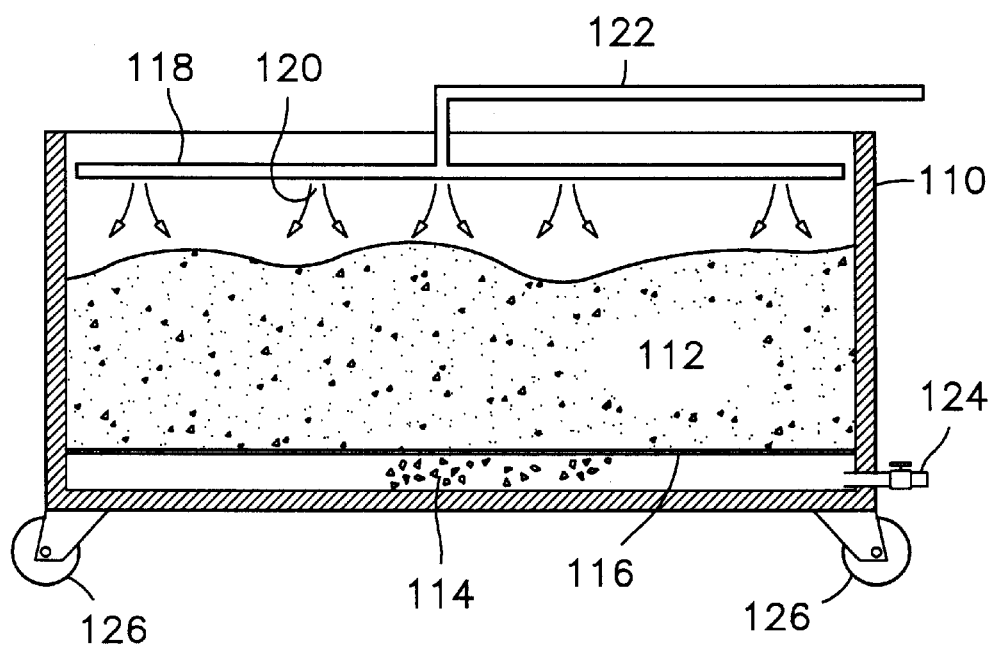
FIG. 8 is a cross-section elevation view of the apparatus for cleaning a contaminated soil at a remote location, as seen along line 8—8 in FIG. 7.

As mentioned hereinbefore, the remediation compositions according to the preferred embodiment are not limited to in situ remediation processes. These compositions may be used with purging water for cleaning soils that have been excavated from a contaminated site. When treatment is effected on an excavated soil mass, a preferred apparatus for treating the contaminated soil is illustrated in FIGS. 7 and 8.

The preferred apparatus comprises an impermeable container 110 having a soil-receiving compartment 112 capable of holding a nominal quantity of contaminated soil. A drain compartment 114 near the bottom of the container may be filled with crushed rocks. The drain compartment 114 is separated from the soil-receiving compartment 112 by a filtering membrane 116 or a wire mesh screen. It will be appreciated that the drain compartment 114 may not contain crushed rocks if the screen 116 is sufficiently strong and/or structurally supported to form a void under the soil-receiving compartment 112 for receiving leachate from the cleaning process.

The remediation composition mixed with purging water is sprayed over the contaminated soil through an array of pipes 118 and nozzles 120 connected to an inlet conduit 122. The drain compartment 114 is connected to an outlet conduit 124 for pumping the emulsified contaminant and remediation solution out of the container 110 and to a conventional treatment installation (not shown). The apparatus 110 may be equipped with casters 126 such as a common dumpster for affording a handling thereof with a winch and transport thereof from site to site on a truck frame. One or more of these apparatus 110 may be left at a work site for receiving excavated soil and for transporting this soil away for cleaning. The apparatus 110 is also usable for receiving excavated soil, for cleaning this soil at the work site and for returning the clean soil to the site as backfill for example.

Because the remediation compositions according to the present invention are used in very low concentration in purging water, they are ecologically safe. As mentioned hereinbefore, the remediation compositions are efficiently used in situ at concentrations as low as 0.0027%. This is approximately 28 to 41 times lower than the lethal concentration ($LC_{50}$) value verified for this type of processes. In the ex-situ processes, the remediation compositions are efficiently used at concentrations as low as 0.022%. This is 3.5 to 5 times lower than the lethal concentration ($LC_{50}$) value verified for this technology.

Also because of their low concentration in purging water, the remediation compositions according to the preferred embodiments are highly biodegradable. Tests have shown that the remediation solutions according to the preferred embodiments have biodegradation rates of 71% to 90% in 28 days. Hence, the remediation solutions and their elements do not remain or concentrate into the environment.

While preferred embodiments of the remediation compositions of the present invention, a preferred phase transfer process and preferred installation and apparatus for carrying out the preferred process, have been illustrated in the accompanying drawings and described hereinabove, it will be appreciated by those skilled in the art that various modifications, alternate compositions, alternate procedures, different constructions and equivalents may be employed without departing from the true spirit and scope of the invention. For examples, it has been found that the remediation compositions according to the preferred embodiments are also efficient in cleaning contaminated bedrock alone, contaminated ground water alone and contaminated drilling mud in a well drilling operation. The remediation compositions are also efficient in cleaning concrete surfaces and other substrates soiled by hydrocarbon products. Therefore, the above description and the illustrations should not be construed as limiting the scope of the invention which is defined by the appended claims.

I claim:

1. A method for cleaning a soil mass and ground water associated with said soil mass contaminated with an organic contaminant, comprising the steps of:

defining a location of said contaminant in said soil mass;

defining a static level of said ground water relative to said soil mass and said contaminant;

defining a smear zone associated with said static level of said ground water;

providing a remediation composition comprising:

an aqueous carrier and a first, second and third surfactants mixed with said aqueous carrier, said first surfactant comprising $C_{33}H_{60}O_{10.5}$; said second surfactant comprising 58% w/w diamylphenoxypolyethoxyethanol and 20% w/w methylenebisamylphenoxypolyethoxyethanol, and said third surfactant comprising 39% w/w calcium dodecylbenzene sulfonate, and 30% w/w octylphenoxypolyethoxyethanol;

preparing a remediation solution containing said remediation composition and water;

injecting said remediation solution in said soil mass until a level of said ground water rises above said static level, above said smear zone and above said contaminant, allowing said remediation solution to soak into said contaminant for encapsulating therein portions of said contaminant;

pumping said remediation solution and said ground water from said soil mass until said level of said ground water is below said static level and said contaminant; and treating said remediation solution and said ground water for extracting said contaminant therefrom;

such that said contaminant is simultaneously washed out from said soil mass and said ground water.

2. The method as claimed in claim 1, wherein said steps of:

injecting said remediation solution in said soil mass until a level of said ground water rises above said static level and said contaminant;

allowing said remediation solution to soak into said contaminant for encapsulating therein portions of said contaminant; and pumping said remediation solution and said ground water from said soil mass until said level of said ground water is below said static level and said contaminant;

are sequentially repeated until said contaminant is substantially washed out from said soil mass and said ground water.

3. The method as claimed in claim 2, wherein said remediation solution comprises a proportion of about 1000 to about 1,100 parts of water for one part of said remediation composition.

4. The method as claimed in claim 3, wherein said contaminant contains a light range hydrocarbon, and said remediation composition comprises per weight relative to said aqueous carrier:

1% of said first surfactant;
1% of said second surfactant;
0.5% of said third surfactant;
0.2% of $C_{20}H_{34}O_4$; and
0.2% of $C_{24}H_{42}O_6$.

5. The method as claimed in claim 3, wherein said contaminant contains a middle range hydrocarbon, and said remediation composition comprises per weight relative to said aqueous carrier:

1% of said first surfactant;
1% of said second surfactant;
0.2% of said third surfactant;
0.5% of $C_{24}H_{42}O_6$; and
0.05% of $C_{20}H_{34}O_4$.

6. The method as claimed in claim 3, wherein said contaminant contains a heavy range hydrocarbon, and said remediation composition comprises per weight relative to said aqueous carrier:

1% of said first surfactant;
1% of said second surfactant; and
1% of said third surfactant.

7. A method for ex-situ cleaning a contaminated site, comprising the steps of:

providing an apparatus comprising a soil-receiving compartment; an array of pipes and nozzles disposed above said soil-receiving compartment and a drain compartment disposed below said soil-receiving compartment;

excavating a soil mass from a designated portion of a contaminated site;

transferring said soil mass into said soil-receiving compartment;

applying to said soil mass a remediation composition comprising an aqueous carrier and a first, second and third surfactants mixed with said aqueous carrier, said first surfactant comprising $C_{33}H_{60}O_{10.5}$; said second surfactant comprising 58% w/w diamylphenoxypolyethoxyethanol and 20% w/w methylenebisamylphenoxypolyethoxyethanol, and said third surfactant comprising 39% w/w calcium dodecylbenzene sulfonate, and 30% w/w octylphenoxypolyethoxyethanol;

cleaning said soil mass with said remediation composition; and returning said soil mass to said designated portion, such that an ex-situ remediation of said contaminated site is easily controlled and systematically doable.

8. A method for reducing an emanation of volatile contaminants from a site contaminated with an odorous organic contaminant, comprising the step of;

applying to said site a remediation composition comprising an aqueous carrier and a first, second and third surfactants mixed with said aqueous carrier, said first surfactant comprising $C_{33}H_{60}O_{10.5}$; said second surfactant comprising 58% w/w diamylphenoxypolyethoxyethanol and 20% w/w methylenebisamylphenoxypolyethoxyethanol, and said third surfactant comprising 39% w/w calcium dodecylbenzene sulfonate, and 30% w/w octylphenoxypolyethoxyethanol;

such that a portion of said volatile contaminants is solubilized and retained to said remediation composition.

* * * * *